United States Patent [19]
Raddi et al.

[11] Patent Number: 6,069,412
[45] Date of Patent: May 30, 2000

[54] POWER FACTOR CORRECTED UPS WITH IMPROVED CONNECTION OF BATTERY TO NEUTRAL

[75] Inventors: William J. Raddi, Raleigh; Joseph C. Paulakonis, Chapel Hill; Robert W. Johnson, Jr., Raleigh, all of N.C.

[73] Assignee: Powerware Corporation, Raleigh, N.C.

[21] Appl. No.: 08/038,469

[22] Filed: Mar. 29, 1993

[51] Int. Cl.[7] .................................................. H02J 7/00
[52] U.S. Cl. .............................................. 307/66; 363/44
[58] Field of Search ................................... 363/44–48, 37, 363/89, 126, 124, 16, 17; 307/66; 323/222

[56] References Cited

U.S. PATENT DOCUMENTS

| | | | |
|---|---|---|---|
| 4,729,081 | 3/1988 | Nilssen | 363/37 |
| 4,823,247 | 4/1989 | Tamoto | 363/16 |
| 4,935,861 | 6/1990 | Johnson, Jr. et al. | 363/132 |
| 4,980,812 | 12/1990 | Johnson, Jr. et al. | 363/44 |

*Primary Examiner*—Jeffrey Gaffin
*Assistant Examiner*—Peter Zura
*Attorney, Agent, or Firm*—Myers Bigel Sibley & Sajovec

[57] ABSTRACT

An uninterrupted power supply (UPS) device with uninterrupted neutral from input to output utilizes the same converter for converting rectified AC power and battery power to positive and negative high voltage (HV) rails. A simple circuit is utilized for connecting the battery to the conversion components of the PFC circuit without adverse affect on the performance of the PFC circuit, and while holding the battery substantially connected to neutral. In a first embodiment, the circuit comprises a simple combination of four diodes and a pair of high pass capacitors arranged so that in both power line and battery supply modes the battery is balanced around neutral. In a second, preferred embodiment, one terminal of the battery is connected directly to neutral.

12 Claims, 5 Drawing Sheets

POWER FACTOR CORRECTED UPS WITH IMPROVED CONNECTION OF BATTERY TO NEUTRAL

BACKGROUND OF THE INVENTION

1. Field of the Invention

This invention relates to uninterrupted power supply (UPS) apparatus and, more particularly, to a power factor corrected UPS maintaining integrity of the connection from power line neutral to an output load terminal.

2. Description of the Prior Art

UPS systems are now widely used to provide a secure supply of power to critical loads such as computers, so that if the line voltage varies or is interrupted, power to the load is maintained at an adequate level and is not lost. The UPS conventionally comprises a rectifier circuit for providing a DC voltage from the AC power lines; an inverter for inverting the DC voltage back to an AC voltage corresponding to the input, for delivery to the load; and a battery and a connection circuit for connecting battery power to the input of the DC to AC inverter, so that when reliable AC power is lost the delivery of AC power to the load is substantially unaffected. In such an UPS, it is highly desirable to maintain an uninterrupted neutral from the commercial AC utility power to each component circuit and to the load, e.g., in order to eliminate shock hazards. Because of the inherent nature and mode of operation of typical UPS systems, conventional UPS designs did not maintain the integrity of the neutral through the processing circuitry, requiring some type of isolation means such as isolation transformer to re-establish the neutral at the load. U.S. Pat. No. 4,935,861, assigned to the assignee of this invention, provides an UPS wherein the electrical continuity of an electrical conductor is maintained from one terminal of the AC utility through to one of the load terminals, without any isolation means being required.

The problem with maintaining integrity of the neutral is further complicated in a UPS having a power factor correction circuit. The task of connecting the battery to neutral is simple in a power supply unit without a PFC circuit, such as shown in U.S. Pat. No. 4,823,247. But as is well known, there are important reasons for incorporating power factor correction (PFC) into an UPS. And, the incorporation of such a PFC circuit imposes additional difficulties upon the goal of maintaining integrity of a neutral connection from the power line to the load. A design for achieving an uninterrupted power supply system having a PFC circuit is disclosed in U.S. Pat. No. 4,980,812, also assigned to the assignee of this invention.

It is recognized that maintaining the integrity of the neutral in an UPS offers advantages of lower cost, due to lack of need for isolation means, and higher reliability. Because of the design criterion of an undisturbed neutral, an UPS with a PFC circuit has heretofore required three converters. As seen in FIG. 1, such a prior art apparatus contains a converter as part of the power factor correction circuit, the output of which provides DC on a positive high voltage (HV) rail and independent negative HV rail respectively relative to the neutral line. The DC-AC inverter is necessarily a second converter, and, a third converter circuit has been necessary to connect the DC from the battery to the HV rails. Prior art attempts to combine the battery converter with the PFC converter have always resulted in either an isolated UPS, wherein the neutral is not maintained, or some circuit arrangement for connecting the DC output of the battery into an AC voltage which could be utilized by the AC to DC converter portion of the PFC circuit. For safety reasons, it is desirable to effectively connect the battery to the neutral, which leaves an unfulfilled need for an efficient and reliable manner of translating the battery output to the HV rails. The design solution of having a third converter of some different kind, or the option of using an isolation transformer, both have obvious disadvantages. The problem is thus how to provide that the converted output from the PFC circuit, as well as the battery output, can be independently loaded and still balanced around neutral to the plus and minus HV rails without using a separate converter of some sort for each. Stated differently, the problem for which a solution has not heretofore been known is how to connect the battery to the HV rails utilizing the PFC converter, while effectively maintaining a connection from the battery to neutral.

SUMMARY OF THE INVENTION

It is an object of this invention to provide a power factor corrected UPS which maintains neutral integrity from the input of the UPS to an output terminal to which the load is connected, the UPS device having a simple and efficient circuit for connecting the battery to the converter of the PFC circuit, whereby whenever the battery provides output power due to deterioration of the utility line voltage, battery voltage is converted through the PFC converter and delivered to the high voltage rails. The UPS achieving this object provides an uninterrupted neutral from its input connection to the AC power line through to an output terminal for connection to the load, balances the battery around neutral, and achieves supply of the battery power independently to the high voltage rails without the need of an independent battery to HV rail converter, or the need for any isolation means.

In a first embodiment, a four diode-two capacitor circuit is used to connect the battery to the PFC converter. During normal operation when the UPS is drawing power from the utility line, the battery is balanced around neutral and is maintained no more than one forward diode drop away from neutral. By using a battery with a voltage less than one-half of the peak of the incoming AC voltage, the PFC circuit is substantially unaffected so that power factors greater than 0.9 can be achieved. During loss of AC input, when the UPS runs on battery, switching elements of the PFC converter are independently turned on and off, enabling conversion of the battery voltage through the PFC converter circuitry to the HV lines. In a second, preferred embodiment, one terminal of the battery is connected directly to neutral, and the other terminal is connected through a normally open switch and a diode to the converting circuit. The switch is closed when low AC power line voltage is sensed. Both embodiments thus enable elimination of a separate converter for the battery while preserving the advantages of prior art power factor corrected UPS devices maintaining integrity of the neutral connection from input to load.

DESCRIPTION OF THE PREFERRED EMBODIMENTS

Figure 1:
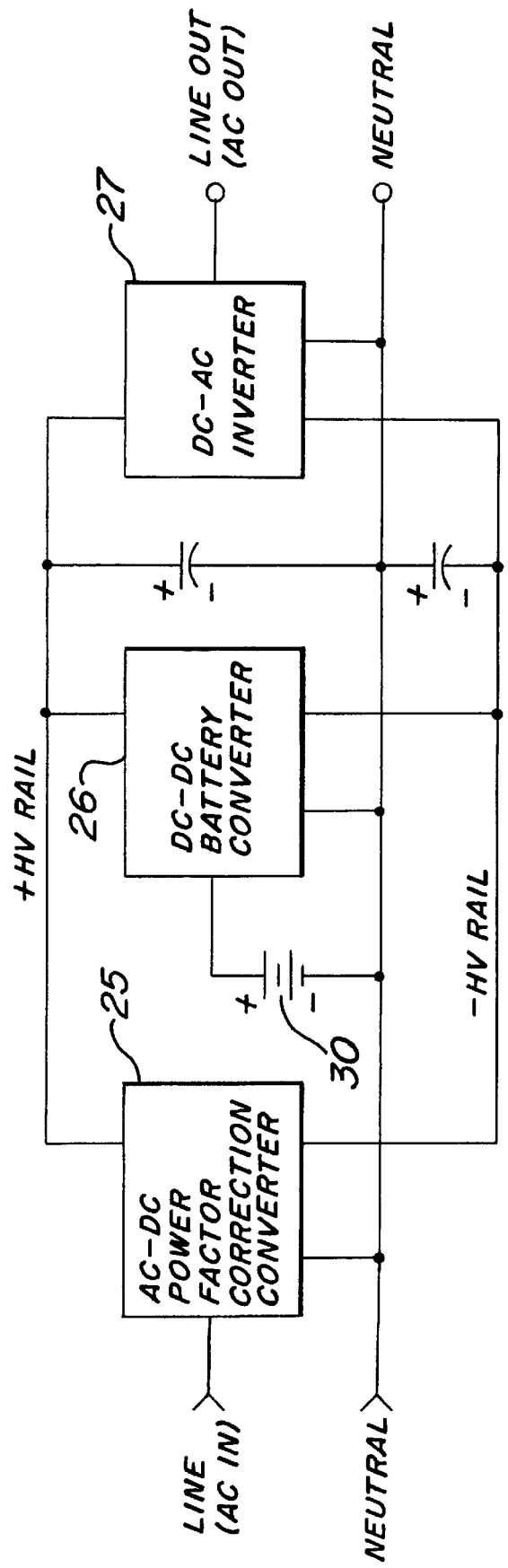
FIG. 1 is a simplified block diagram showing the primary components of a prior art power factor corrected UPS.
Figure 2:
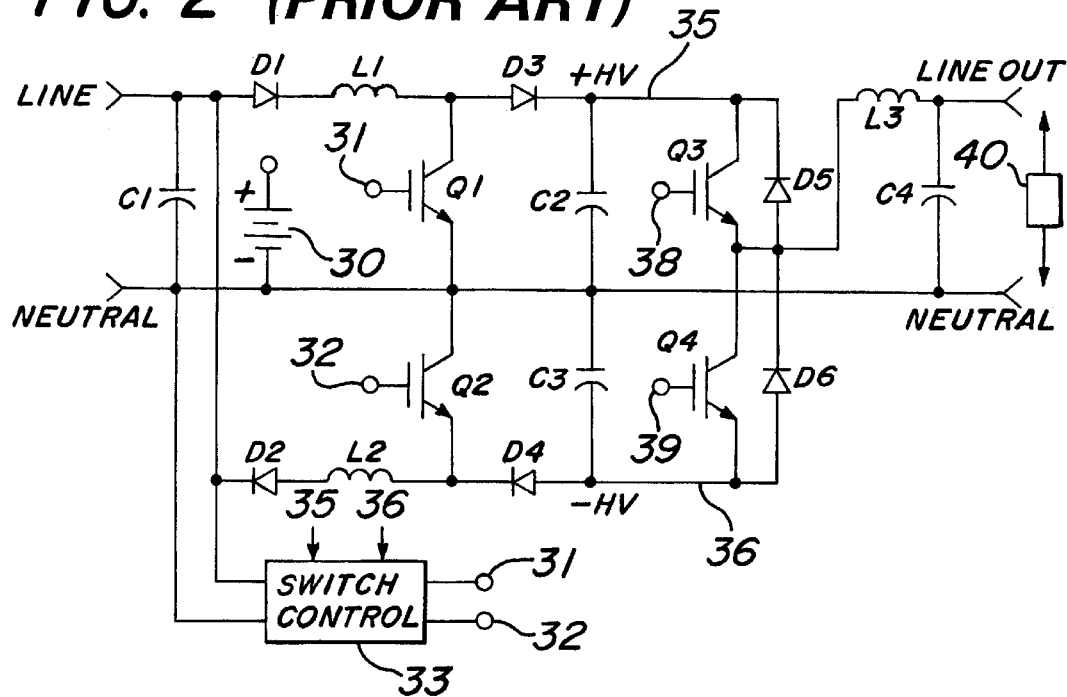
FIG. 2 is a simplified circuit diagram of a power factor corrected UPS with neutral integrity, and illustrating the problem of connecting the battery to the HV rails without the aid of a converter dedicated to the battery.

Referring now to FIG. 2, there is shown a circuit diagram of a typical power factor corrected UPS with an uninterrupted neutral from input to output. The AC input is connected to the UPS at two input terminals, one of which is marked "line" and the other of which is marked "neutral." The neutral line is connected by an uninterrupted conductor to one of two output terminals, across which AC output power is delivered. The AC input signal is connected across a first capacitor C1. The line terminal is connected to rectifier diodes D1 and D2. D1 is in series with inductor L1, the other side of L1 being connected through switching transistor Q1 to neutral. D2 is connected in series with inductor L2, the other side of L2 being connected through switching transistor Q2 to neutral. The input terminals 31, 32 are driven by switch control means 33 such as illustrated in FIG. 1 of U.S. Pat. No. 4,980,812, incorporated herein by reference. Transistors Q1 and Q2 of FIG. 2 correspond to transistors 86 and 88 seen in FIG. 1 of the referenced patent. Transistors Q1 and Q2 are driven in such a manner as to achieve a power factor close to 1.0, and to maintain needed voltage across C2 and C3. Inductor L1 is also connected through diode D3 and capacitor C2 to neutral; and inductor L2 is connected through diode D4 and capacitor C3 to neutral. When Q1 is turned off after it has been conducting, current is passed through L1 and D3 to charge capacitor C2, maintaining positive voltage on the +HV rail 35. Likewise, when Q2 is turned off after having been turned on during a negative swing of the line voltage, current from inductor L2 passes through diode D4 and charges capacitor C3, maintaining negative voltage on high V rail 36.

Still referring to FIG. 2, HV rails 35 and 36 have connected therebetween transistor switches Q3 and Q4 in series, which are driven at input terminals 38 and 39 by a reference signal in a well known manner, so as to alternately switch on during respective half cycles of positive and negative going voltage. Diode D5 is placed across transistor Q3, and diode D6 is placed across transistor Q4. The switched voltage appearing at the node between transistors Q3 and Q4 is connected to filtering inductor L3, and the AC output which appears across capacitor C4 drives the load 40 connected between line out and neutral.

Battery 30 is shown in FIG. 2, having its negative terminal connected to neutral, but its positive terminal unconnected. The longstanding problem in the art, which this invention meets, is how to connect the battery in such a way as to enable generation of the plus and minus HV rails from such battery at the time of AC input line failure. What is needed is a simple but reliable circuit which can utilize the inductor and switching components of the PFC circuit, i.e., inductors L1 and L2, and transistors Q1 and Q2.

Figure 3:
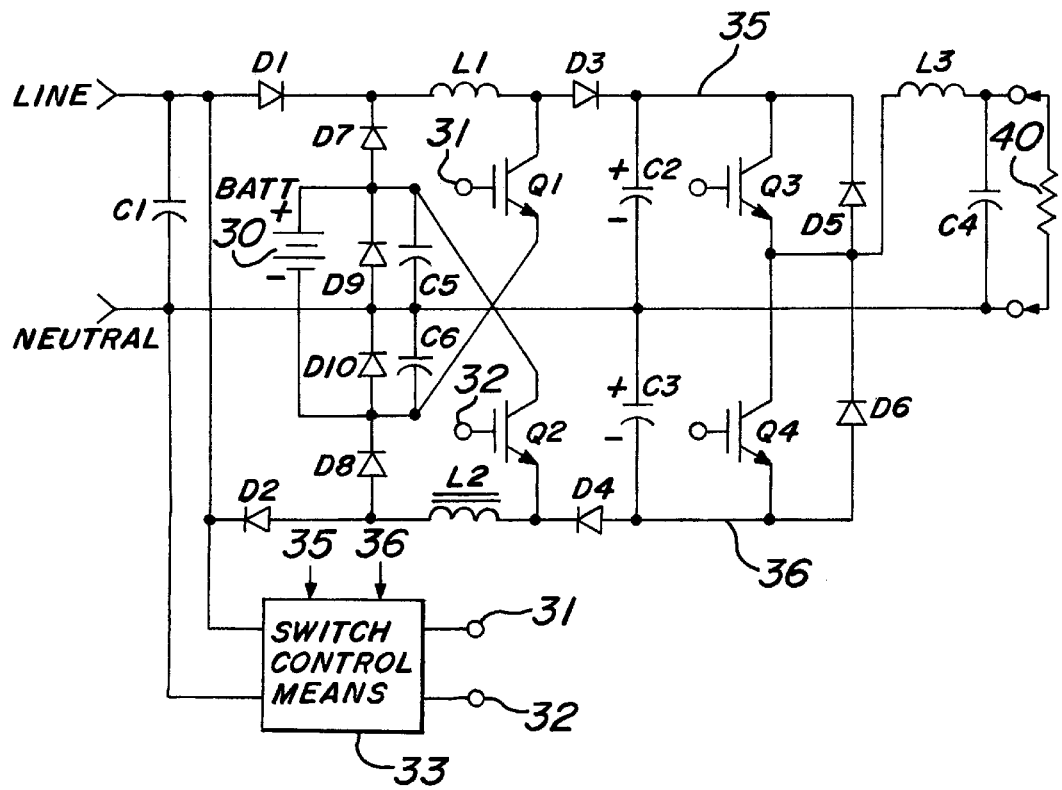
FIG. 3 is a circuit diagram showing a first embodiment of the improved connection circuit of this invention, whereby the battery is connected to the converter of the PFC circuit while maintaining the battery balanced around neutral.

Referring now to FIG. 3, there is shown an improved circuit which connects the battery to converter elements of the power factor correction circuit of FIG. 2. In addition to the circuit components illustrated in FIG. 2, there is illustrated a battery 30 which is tied at its plus terminal to neutral through diode D9, and at its minus terminal to neutral through diode D10. Bypass capacitors C5 and C6 bridge diodes D9 and D10 respectively, and are chosen to have a large capacitance with respect to the switching frequency of switches Q1 and Q2, which is determined by control circuit 33. The positive terminal of the battery is also connected through D7 to a node between D1 and L1, and the negative terminal of the battery is connected through diode D8 to a node between D2 and L2. Instead of connecting Q1 and Q2 to neutral as in FIG. 2, the emitter of Q1 is connected to the negative terminal of the battery, while the collector of Q2 is connected to the positive terminal of the battery. Thus, in terms of extra circuit components, the improved circuit comprises the simple addition of four diodes and two high frequency bypass capacitors. During normal operation the battery is balanced around neutral, and never gets more than a forward biased diode drop away from neutral, e.g., about one-half to three-fourths volts. By utilizing a battery that has a voltage less than one-half the peak of the incoming AC voltage, the power factor correction circuit operates over a sufficiently long portion of each cycle to achieve a power factor greater than 0.9.

Figure 4A:
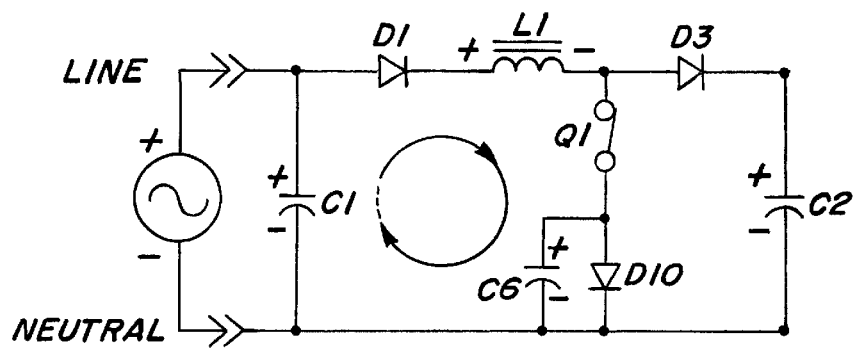
FIG. 4A and 4B are circuit diagrams illustrating a cycle of operation when the UPS of FIG. 3 is drawing power from the AC input, and the line or energized AC input terminal is positive relative to the neutral terminal.
Figure 4B:
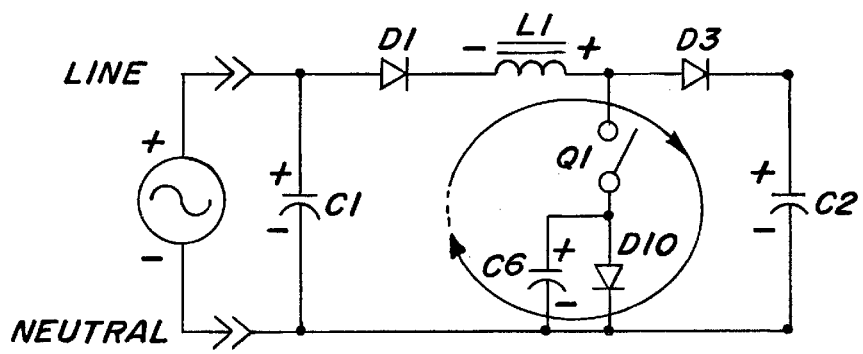
Figure 5A:
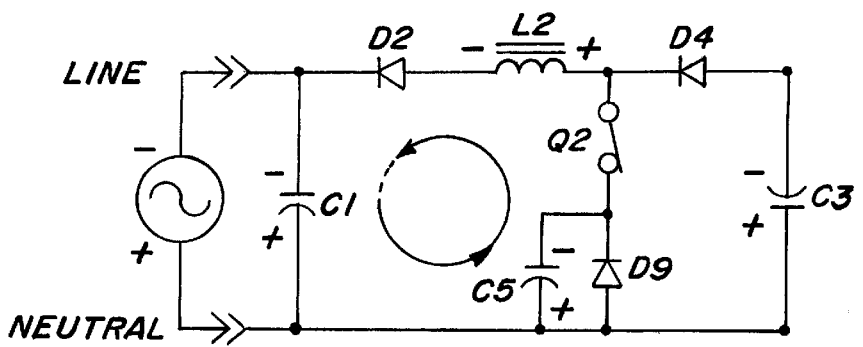
FIGS. 5A and 5B are circuit diagrams illustrating a cycle of operation when the UPS of FIG. 3 is drawing power from the AC input, and the line or energized AC input terminal is negative relative to the neutral terminal.
Figure 5B:
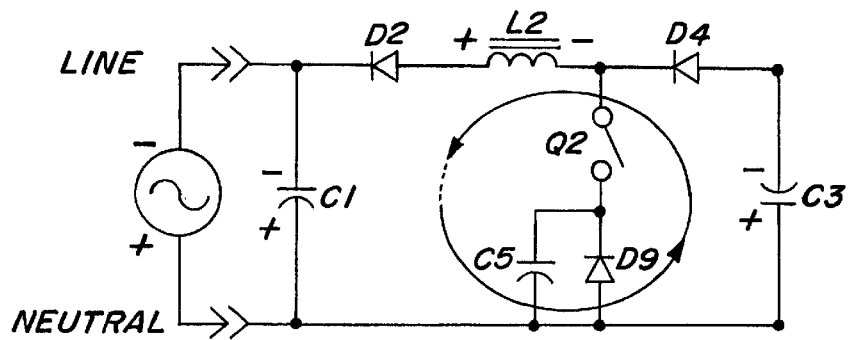

Referring now to FIGS. 4A and 4B, there are illustrated circuit diagrams showing the equivalent circuit operation under conditions where there is a good input on the AC line, and the input voltage is positive and greater than battery voltage. In FIG. 4A, Q1 is illustrated in an on or closed switch position, and in FIG. 4B is illustrated in an off, or open switch position. Note that Q1 is turned on only when the voltage peak is greater than the battery voltage, such that D7 is reversed biased. In this condition, as illustrated in referenced U.S. Pat. No. 4,980,812, capacitor C2 is shunted by Q1 and current builds up in inductor L1. When Q1 opens, as shown in FIG. 4B, L1 acts as a current generator and pumps current into capacitor C2, building up the DC voltage thereacross. FIGS. 5A and 5B show the equivalent circuit diagram when the line terminal is negative and the voltage exceeds the battery voltage. In a similar fashion, when Q2 is closed and thus shunts C3, current builds up through L2. When Q2 is opened, current is pumped from L2 into capacitor C3, thereby generating a negative voltage across C3 with respect to neutral. These respective operations generate the positive and negative HV rails indicated in FIG. 3, in a manner that is substantially unchanged with respect to the embodiment of U.S. Pat. No. 4,980,812. During this typical cycle of operation, forward biased diode D10 connects current through Q1 while it is closed, and forward biased diode D9 is in series with switch Q2 when it is closed, with the result that the improved circuit has no appreciable impact on the operation of the PFC conversion. During the positive line voltage swing, the negative terminal of the battery is tied to neutral through D10; during the negative line voltage swing, the positive terminal of the battery is tied to neutral through D9.

Figure 6A:
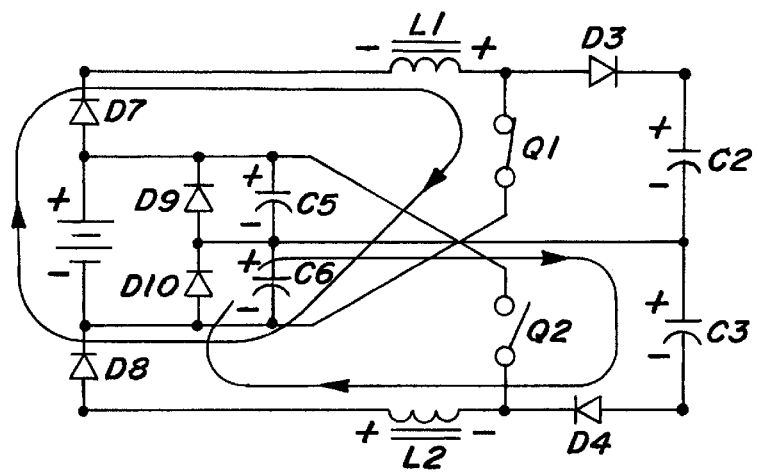
FIG. 6A and 6B illustrate operation of the improved UPS circuit of FIG. 3 during a condition of unacceptable AC input and UPS battery operation.
Figure 6B:
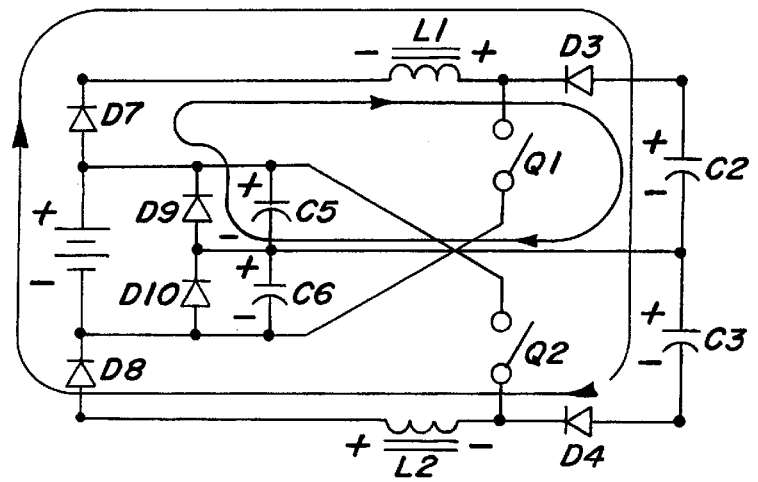

Referring now to FIGS. 6A and 6B, there are illustrated the effective circuit diagrams for the UPS circuit of this invention during loss of AC input, i.e., at any time when UPS load is being supplied by the battery. During this time, the improved switching circuit acts to connect the battery to alternately charge C2 and C3 so as to maintain the same plus and minus high voltage rails. During such battery back up operation, switches Q1 and Q2 are turned on and off independently, by switch control 33.

When the AC source voltage drops to an unacceptable level, switch control 33 operates to drive Q1 and Q2 through on-off cycles, at a duty cycle as required to provide a regulated output. Note that each of Q1 and Q2 can be switched independently, as may be required for an unbalanced load (not shown unbalanced). Q2 is held off (open) while C2 is charged, and Q1 is held off while C3 is charged.

During the period of time that Q2 is held off, Q1 is first switched on and then switched off. FIG. 6A shows Q2 off and Q1 switched on. Under these circumstances, current flows from the battery through diode D7, inductor L1, and back through switch Q1 to the negative terminal of the battery, building up current flow in inductor L1. At the same time, remaining current through L2 is discharged through diode D8, diode D10, capacitor C3 and diode D4. When Q1 is turned off (FIG. 6B), the build up of current is passed through diode D3 into capacitor C2, charging it positively with respect to neutral. The current through C2 returns through diode D9. At the same time, current from battery 30 goes around the outer loop of the circuit shown, i.e., through D7, L1, D3, C2, C3, D4, L2 and D8. Following this, the sequence is reversed such that Q1 is turned off, and Q2 is alternatingly turned on and off, resulting in the reverse operation which builds up the negative voltage across capacitor C3. During the battery supply of the output voltage, if capacitor C2 and C3 are loaded in a balanced manner, and if C5 and C6 have large capacitance for the switching frequency, then the voltage across each of capacitors C5 and C6 is held substantially constant and has a value of approximately one-half the voltage of the battery. To the extent that C2 and C3 loading becomes unbalanced, the ratio of the voltages across C5 and C6 likewise is unbalanced.

Figure 7A:
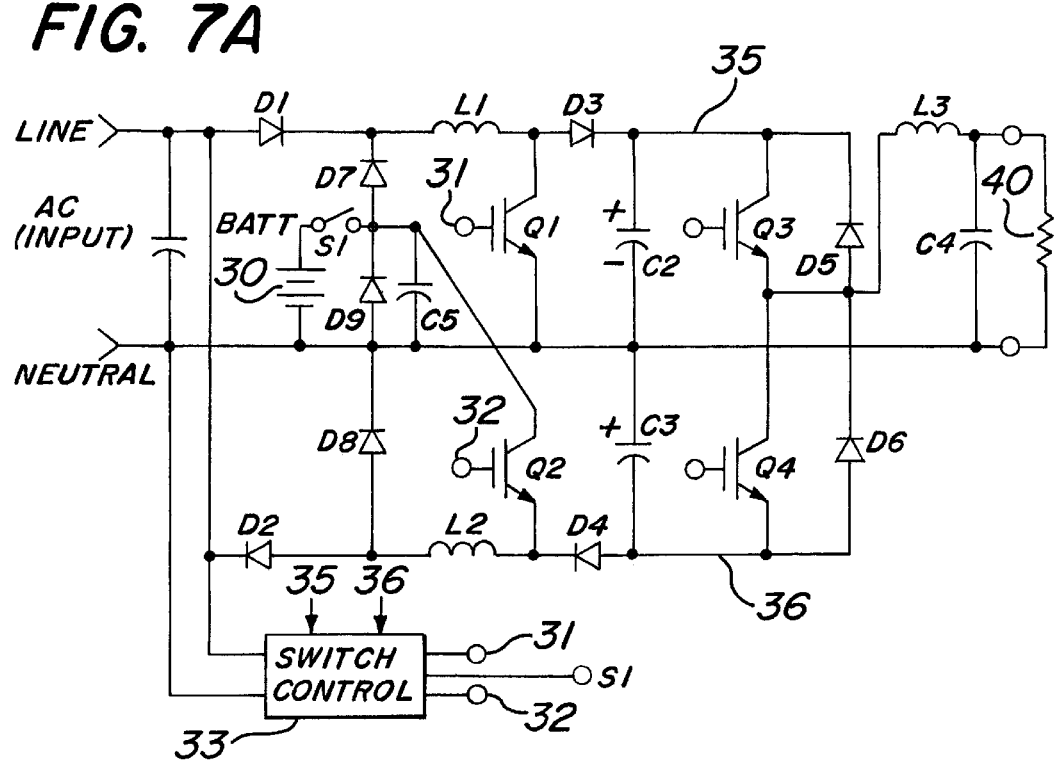
FIG. 7A is a circuit diagram of a preferred embodiment of the invention, wherein one terminal of the battery is connected directly to neutral.
Figure 7B:
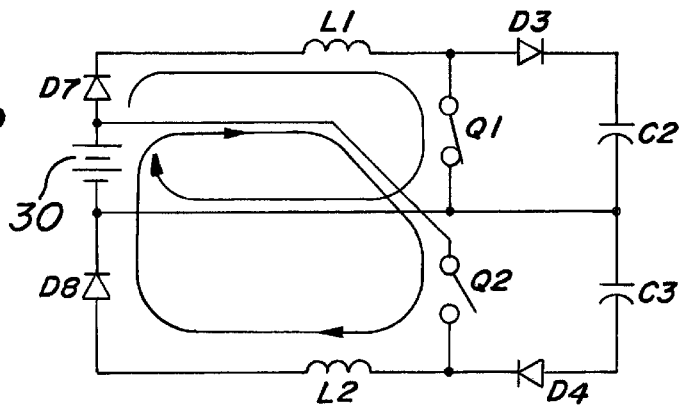
FIGS. 7B and 7C are circuit diagrams illustrating a cycle of battery-driven operation for the circuit of FIG. 7A.
Figure 7C:
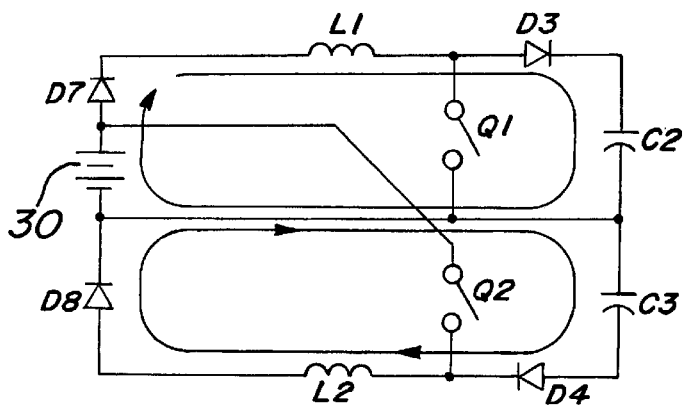

Referring now to FIG. 7A, there is shown a preferred circuit. In this embodiment, battery 30 has one terminal (illustrated as the negative terminal) connected to neutral. The other terminal is connected through switch S1 to D7. Switch S1 is normally open, but is closed by control 33 whenever low line voltage is detected, in a conventional manner. Compared to FIG. 3, diode D10 and capacitor C6 are eliminated, and switch S1 is added. FIGS. 7B and 7C illustrate the circuit action when the load is battery-driven. In FIG. 7B, each of switches Q1 and Q2 are closed, such that current flows from battery 30 to each inductor L1, L2. In FIG. 7C, Q1 and Q2 are each switched open, so that current flows from L1 to C2, and from L2 to C3. In this embodiment as well, switch control 30 can drive Q1 and Q2 independently when the UPS is in the battery-driving mode due to low source AC voltage.

Both the preferred embodiment of FIG. 7A and the embodiment of FIG. 3 illustrate a DC to AC converter (utilizing transistors Q3, Q4), for providing uninterrupted AC output. However, the invention also applies to a supply for providing a DC output, such that no DC to AC inverter is utilized. Thus, in general, the invention comprises an output circuit between the HV rails and the output terminals.

There is thus illustrated a very simple, inexpensive and reliable circuit which achieves the object of connecting the battery to an UPS having an uninterrupted neutral from input to output, the battery connection being made in such a way as to utilize the PFC circuit for conversion of the battery voltage during times when the battery is supplying output load. At the same time, the circuit ties one terminal of the battery to neutral, or holds the battery balanced around neutral, and does not adversely affect performance of the PFC circuit. The invention thus achieves the object of allowing the battery to be connected to neutral at all times, while utilizing the PFC circuit to convert the battery output to the HV lines at the time of AC power source failure.

What is claimed:

1. An uninterrupted power supply (UPS), having first and second input terminals for connection to a power line source, one of said terminals being connected to power line neutral, first and second output terminals, one of said output terminals being connected to said neutral through an uninterrupted conductor, and a battery, comprising a power factor correction (PFC) circuit having an AC to DC converter circuit, an input connected across said input terminals, and having a positive output terminal providing a positive DC high voltage with respect to said neutral and a negative output terminal providing a negative high DC voltage with respect to neutral, a high positive voltage rail connected to said positive output terminal and a negative high voltage rail connected to said negative output terminal, an output circuit having an input connected across said positive and negative rails, and providing an output to said output terminals, and battery connection circuit means for connecting said battery to said PFC converter circuit so that when the power line voltage fails and said UPS is in battery mode operation, battery voltage is converted through said PFC converter circuit to supply said positive and negative high voltage rails.

2. The UPS of claim 1, wherein said PFC converter circuit comprises a first inductance and a first capacitor connected between said positive high voltage rail and neutral, and a second inductor and a second capacitor which is connected between said negative high voltage rail and neutral, and wherein said battery connection circuit operatively connects said battery to drive each of said first and second inductors during power line failure.

3. The UPS as described in claim 1, wherein said PFC converter circuit comprises first and second switching elements, and further comprises switching means for switching said switching elements under normal operation and battery mode operation.

4. The UPS as described in claim 1, wherein said battery has first and second output terminals and said battery connection circuit connects one of said terminals directly to said neutral.

5. The UPS as described in claim 1, wherein said battery has first and second output terminals and wherein said battery connection circuit comprises a diode connected between neutral and at least one of said battery terminals.

6. The UPS as described in claim 4, further comprising a switch connected to the other one of said battery terminals, said switch being normally open, and switching control means for closing said switch when the voltage on said power line source falls to a predetermined unacceptable level.

7. The UPS as described in claim 1, wherein said output circuit is a DC to AC converter.

8. An uninterrupted power supply (UPS), having first and second input terminals for connection to a power line source, the first of said input terminals being connected to power line neutral, first and second output terminals, an uninterrupted neutral connection from said first input terminal to said first output terminal, for connecting neutral directly to said first output terminal, comprising:

a rectifier means connected to said input terminals for providing positive and negative rectified voltage outputs, a power factor correction (PFC) circuit having inputs connected to the outputs of said rectifier means, said PFC circuit having an AC to DC converter circuit for providing positive and negative DC voltage outputs relative to said neutral connection, a battery having first and second output terminals, one of said terminals being connected directly to said neutral connection, and a connection circuit for connecting the other of said battery terminals to one of the inputs of said PFC converter circuit so that when the power line voltage fails battery voltage is converted through said PFC circuit to provide said positive and negative DC voltage outputs, and an output circuit having an input connected across said positive and negative DC outputs and providing an output across said output terminals.

9. The UPS as described in claim 8, wherein said output circuit is a DC to AC converter.

10. The UPS as described in claim 8, wherein said battery connection circuit comprises a switch for controllably connecting said battery to said PFC converter circuit.

11. The UPS as described in claim 8, comprising control means for controlling said PFC converter circuit when the power line source is below a predetermined voltage level.

12. An uninterrupted power supply (UPS) having first and second input terminals for receiving AC power from a power source, one of said input terminals being connected to the neutral of said power source, said UPS providing AC output power to a pair of output terminals, said UPS being operable in an AC mode when said power source delivers a predetermined satisfactorily high voltage and operable in a battery mode when said power source does not deliver said satisfactorily high voltage, comprising:

only one converter circuit for providing a DC output;

a power factor correction circuit for delivering a power factor corrected power from said input terminals, said power factor correction circuit including said only one converter circuit;

a battery and a battery connecting circuit for providing energy to said one converter circuit so as to provide said DC output when in said battery mode;

a DC to AC converter for converting the output of said one converter circuit to provide AC power to said output terminals; and an uninterrupted connection for connecting (a) said one input terminal connected to neutral, (b) one of said battery terminals and (c) one of said AC output terminals, whereby power neutral is connected directly to said battery and to a load connected across said AC output terminals.

* * * * *